United States Patent [19]

Ley et al.

[11] Patent Number: 5,396,782

[45] Date of Patent: Mar. 14, 1995

[54] INTEGRAL SUSPENSION SYSTEM

[75] Inventors: Thomas A. Ley, La Crosse, Wis.; James W. Noben, Dakota, Minn.

[73] Assignee: American Standard Inc., Piscataway, N.J.

[21] Appl. No.: 130,894

[22] Filed: Oct. 1, 1993

[51] Int. Cl.[6] ............................................. F25D 19/00
[52] U.S. Cl. .................................... 62/295; 62/297; 248/636; 248/638
[58] Field of Search .................. 248/636, 638; 62/295, 62/297

[56] References Cited

U.S. PATENT DOCUMENTS

| | | | |
|---|---|---|---|
| 2,661,836 | 12/1953 | Jewell | 62/295 |
| 2,666,302 | 1/1954 | Philipp | 62/295 |
| 3,721,106 | 3/1973 | Bierwirth et al. | 62/297 |
| 4,891,955 | 1/1990 | Klausing et al. | 62/297 |
| 5,040,953 | 8/1991 | Tinsler | 248/638 |

OTHER PUBLICATIONS

Robert S. Jones (Author), "Noise and Vibration Control in Buildings", 1984 Edition,, pp. 28-31, 44, 48, 144 and 140.

Trane, "Modular Climate Changer ® Central Station Air Handlers", Installation Maintenance, CLCH-IM-15A, Jan., 1992.

*Primary Examiner*—Ronald C. Capossela
*Attorney, Agent, or Firm*—William J. Beres; William O'Driscoll; Peter D. Ferguson

[57] ABSTRACT

A suspension system for a component of an air conditioning system adapted for mounting the air conditioning system to a support surface. The suspension system is designed for use with an air conditioning system component that is mounted on spaced apart support rails. The suspension system is integrated into the support rail and eliminates the need for a self contained suspension system that must have specially designed mounting points for attachment to the support rails. The integrated design provides for resistance to lateral loads and facilitates the interchange and replacement of suspension system components. The suspension system comprises a spring for absorbing motion occurring between the air conditioning system component and the support surface. The spring has a first end and a second end, and defines a spring axis extending between the two ends. A receptacle is formed integral to a respective one of the support rails for supporting the first end of the spring. The receptacle defines a partially enclosed volume adapted for receiving and substantially enclosing the first end of the spring. A base is connected to the support structure for supporting the second end of the spring. The base includes a plurality of lateral movement restraining devices for restraining movement of the second end of the spring that is transverse to the spring axis.

25 Claims, 3 Drawing Sheets

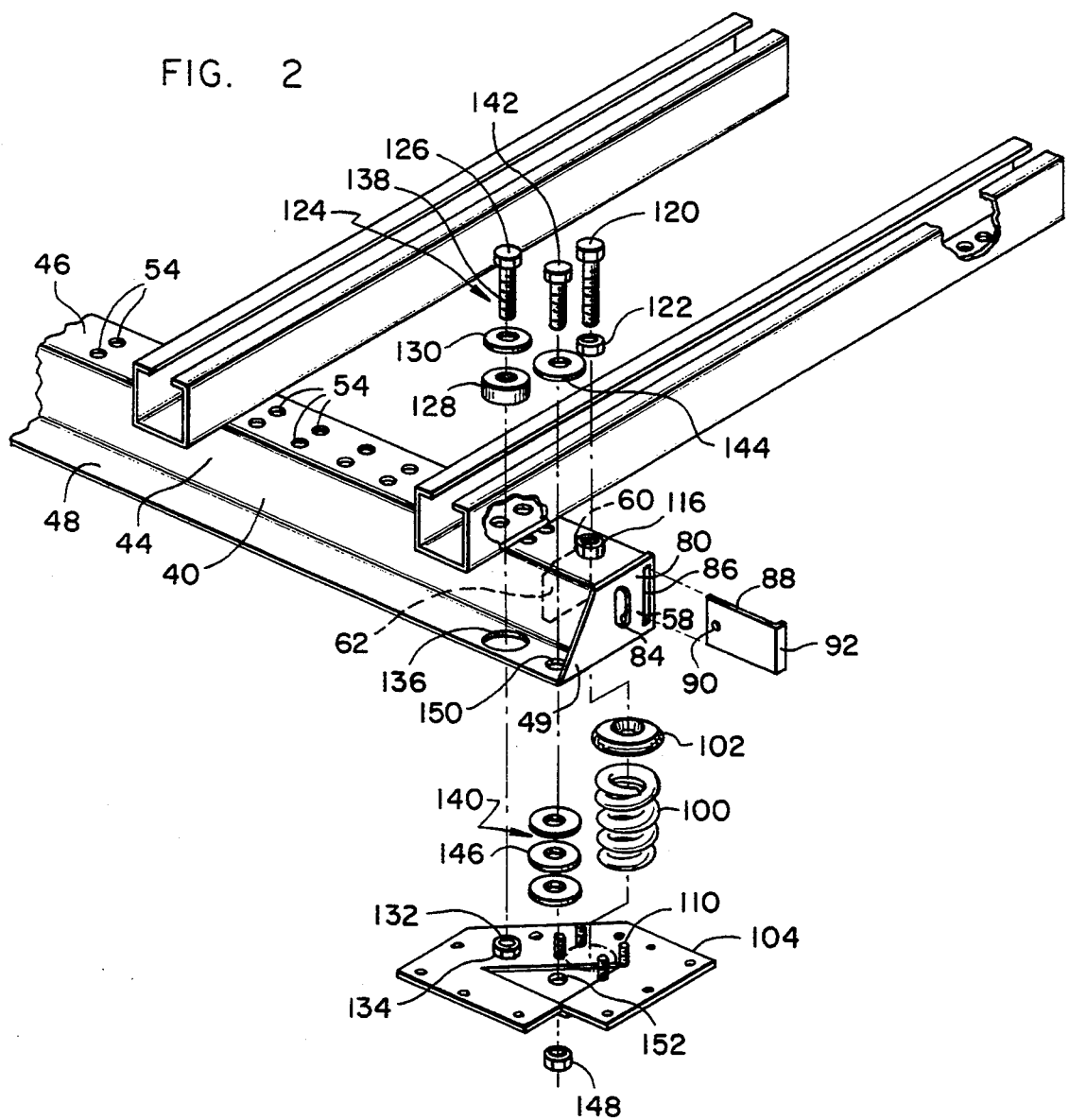

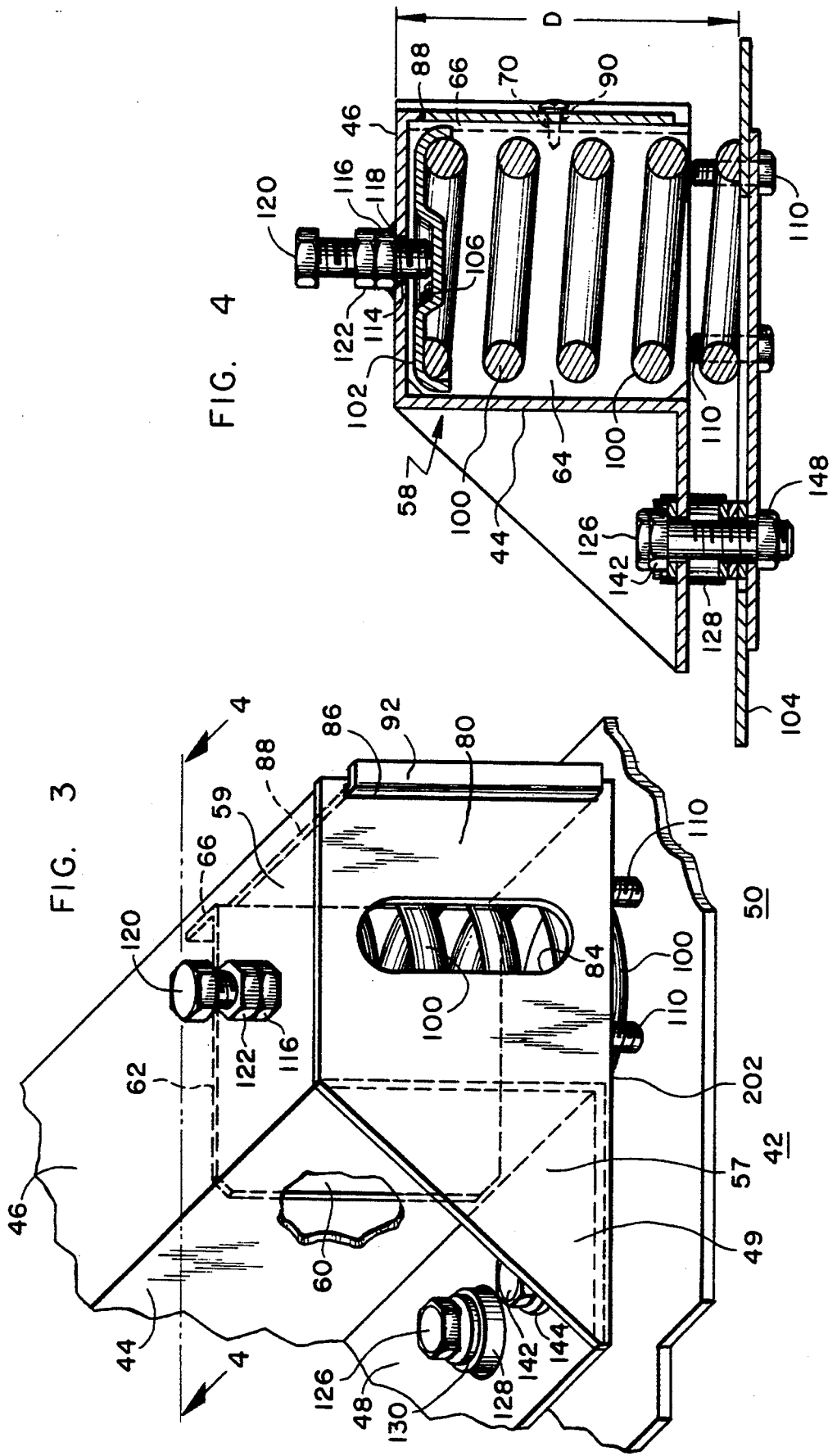

INTEGRAL SUSPENSION SYSTEM

TECHNICAL FIELD

The present invention relates to a suspension system for the central station air handler of an air conditioning heating and cooling system. More particularly, the present invention relates to a spring loaded suspension system supporting the air side portion of the central station air handler.

BACKGROUND OF THE INVENTION

Air conditioning systems typically contain an air side loop where the air to be forced into the zone or space being air conditioned is either heated or cooled as desired.

In many modern, industrial type air conditioning systems, the air side of the air conditioning system consists of a central station air handler. A central station air handler is designed to have the flexibility to accommodate the air handling needs of various industrial users by assembling any number of specialized but compatible components in the air handler, each of which have a different function. The requirements vary depending on the application such as, for example, use with a large retail outlet, a hospital, or a light industrial manufacturing plant. Accordingly, a number of different components are designed to be selected and assembled in a single unit as desired for the particular application.

Central station air handling units may include a fan unit, an inspection blank, a coil, a filter, a mixing box and a discharge plenum. Special applications might require additional components. A hospital, for example, may have unique filtering requirements that would require inclusion of a number of different filter units in the air handler.

The various components of a central station air handler are designed to be assembled together into a single unit in which the air flow starts at one end and is discharged at the opposite end. The fan forces air through the coil where the air is cooled or heated. The filter removes certain unwanted materials from the conditioned air. The mixing unit is incorporated in certain applications to mix exterior air with the return air in order to take advantage of the cooling effect of the outside air during the cooler seasons of the year and to provide a certain amount of fresh air to the building so that the various zones do not feel stuffy to the occupants. Finally, the discharge plenum unit accepts the chilled/mixed air and discharges it into the air conditioning ducts for conveyance to the various zones for cooling the zones.

In the case of modular air handlers, the various components of a central station air handler are assembled into a single unit by bolting the internal frame of each component to the internal frame of the adjacent components. The assembly usually is accomplished at the factory so that the air handler is shipped as a specialized unit to the site for installation. A spring loaded suspension system is provided to isolate the air handler's fan from the air handler cabinet and building structure.

In the past, the suspension system for supporting the fan has been designed as an add-on feature mounted beneath the fan or suspended from special brackets. The suspension system designs have typically utilized a coil spring contained between two housings made of a cast metal. An oppositely directed cup is located at either end of the spring to contain the spring. The spring is then held in place between the two cups by the compressive force of the weight of the air handler.

The suspension system was usually procured by the air conditioner manufacturer from a fabricator vendor that produced the suspension systems. In order to mount the suspension system, the manufacturer had to make an upper and a lower suspension system mount that effectively was redundant with the upper and lower housings of the suspension system that was supplied to the manufacturer. Accordingly, the lower housing was affixed to the unit base with bolts mounted to a specially designed mount. Likewise, the upper housing was affixed to the fan with a central bolt to a mount that is specially designed to mate the suspension system to the fan. This means of mounting the suspension system required the production and utilization of redundant mounting devices. Further, suspension systems of this design are susceptible to lateral loads imposed on the air handler. The lateral loads on the air handler have a tendency to dislodge the coil spring from the cups. Extensive time and cost is required to repair a suspension system once the springs have been dislodged.

In order to accommodate lateral loads, later suspension systems were designed with the housings having tongues descend a substantial distance in two opposed quadrants. While such housings can accommodate lateral loads on the air handler in a single direction, the long descending tongues of the upper cup are susceptible to jamming on the lower cup when vertical loads were imposed on the air handler, thereby disabling the suspension system. Additionally, the castings and mounts represent a cost that should be eliminated in the interest of efficiency.

An alternate design includes plates welded on either end of the spring, with one of the plates bolted to the unit base and the other bolted to the fan. While this design deals with the problem of spring dislodgement and jamming due to lateral forces, it resulted in another problem. Since there is no lateral restraint of the springs in this design, the use of such suspension systems made the air handling unit unduly subject to lateral motion. This motion was essentially unchecked and was therefore undesirable. Additionally, the heat generated during welding frequently had the effect of adversely affecting the resilient qualities of the spring. A further problem with this design is that it makes replacement of the spring very difficult since the spring is welded to two mounting plates that are in turn bolted to the building structure and to the rails of the air handler.

Mounting of the suspension system to the air handler should be as simple as possible and redundant parts eliminated. Suspension systems of the types just described frequently required special upswing cantilever brackets at each corner of the air handler from which the suspension system depended. Such brackets were utilized to reduce the vertical height that the suspension system added to the air handler. In these uses the manufacturing costs included not only the separate suspension system, but also included the special cantilever bracket as well.

There is an ancillary need to provide restraint for the air handler in some applications where there is a likelihood of seismic activity. This restraint must permit a certain amount of movement in response to a seismic event while, at the limit of the movement allowed, providing positive restraint of the air handler so that the air handler is not displace from its mounting position in the building during a seismic event. The restraint needs to be in both the horizontal and vertical planes. Snubbers have in the past been added to the air handler for that purpose. Typically, the snubbers were located along the sides of the air handler. Again these were designed by fabricator suppliers and required their own dedicated mounting devices to mount the snubbers both to the building and to the air handler. This also added redundancy in the mounts to the suspension system. It would be a decided advantage to have the seismic snubbers integrated with the suspension system and be of simple design. Redundant mounts must be eliminated.

The industry needs to provide adequate suspension of air handlers with a minimum of cost and a maximum of flexibility with respect to replacing and inter changing the spring component of the suspension system. Accordingly, it would be a decided advantage in the air conditioning industry to provide a suspension system for an air handler that could successfully withstand significant lateral forces on the air handler without dislodging the coil spring, and which could sustain large vertical forces on the air handler without the upper housing of the coil spring becoming compressibly engaged with the lower housing of the coil spring. Further, it would be advantageous to provide a suspension system that is integral to the support rails in order to reduce manufacturing costs and to minimize the height added by the suspension system to the air handler package. Special bracketing to support the suspension system should be minimized.

SUMMARY OF THE INVENTION

The present invention solves the above noted problems of previous suspension system designs by including a four sided receptacle that is integral to a support rail for substantially enclosing the coil spring of the suspension system. By making the suspension receptacle integral to the rails, the redundant mounts are eliminated. Lateral support of the springs is provided without the attendant problem of binding. The springs are easily replaced since the springs are designed to be slipped in and out of the receptacle and are designed to be retained in place only by the compressive force of the weight of the air handler. The optional seismic snubber is of simple design and is integrated with the suspension system to eliminate redundancy.

The support rails preferably utilized in the present invention are referred to as Z rails. This appellation results from the shape of the rail as viewed end on. The Z rail has three components, each of which can be described as a long metal strap having a rectangular cross section in which the width dimension is very small with respect to the length dimension. The Z rail is formed such that a first strap is positioned vertically. A second strap is formed at the bottom of the vertical strap and projects horizontally from the vertical strap. The third strap is formed at the top of the vertical strap and projects horizontally from the vertical strap. The top horizontal strap and the bottom horizontal strap are oppositely directed with respect to the vertical strap, such that when viewed end on the Z rail appears to form a Z in cross section. It is understood by those familiar with the art that inverted U-shaped rails could as well be utilized.

The integral, four sided receptacle of the present invention is of sufficient depth to substantially enclose the suspension system coil spring, thereby preventing lateral forces from dislodging the spring, while at the same time retaining enough clearance to tolerate full compression of the spring. The receptacle is of such design that large vertical loads on the air handler do not force the receptacle into engagement with any portion of the lower spring retaining devices, thereby avoiding the problem of jamming the upper and lower spring supports together. The design of the present invention further eliminates the need for welding of any retaining base members to the spring and provides for easy replacement of the spring. Replacement of a spring suspension unit that is already installed on an air handling unit is accomplished by simply jacking the corner of the air handling unit at which the spring support is located and sliding the old spring out of the receptacle and replacing it with a new spring. Easy replacement is a particular advantage, because the total weight of a fan assembly varies as a function of the make up the fan assembly. Accordingly, a number of springs of differing compression are available for inclusion in the suspension system.

The present invention utilizes an upper inverted cup to retain the upper coil of the coil spring. The cup is inserted into the receptacle formed integral to the rail. A threaded central bolt that passes through the top horizontal strap of the Z rail engages the upper side of the cup and provides a means for adjusting the height of the suspension system for leveling the air handling unit. A base plate is incorporated into the suspension system that has four upwardly projecting coil spring retainers oriented in a square. Each such retainer closely engages the outside of the bottom coil of the coil spring. The suspension system allows for the incorporation of a snubber system to accommodate seismic events and a tie down system to permit the suspension system to be put in a rigid state for transportation of the assembled air handling unit.

BRIEF DESCRIPTION OF THE DRAWINGS

FIG. 2 shows an exploded view of a suspension system in accordance with the present invention depicted in conjunction with the supporting Z rail for a modular air handler system.

FIG. 3 shows a perspective view of the suspension system and supporting Z rail.

FIG. 4 shows an elevational end view of the suspension system with the cover angle removed for clarity.

DETAILED DESCRIPTION OF THE DRAWINGS

Figures 1, 5:
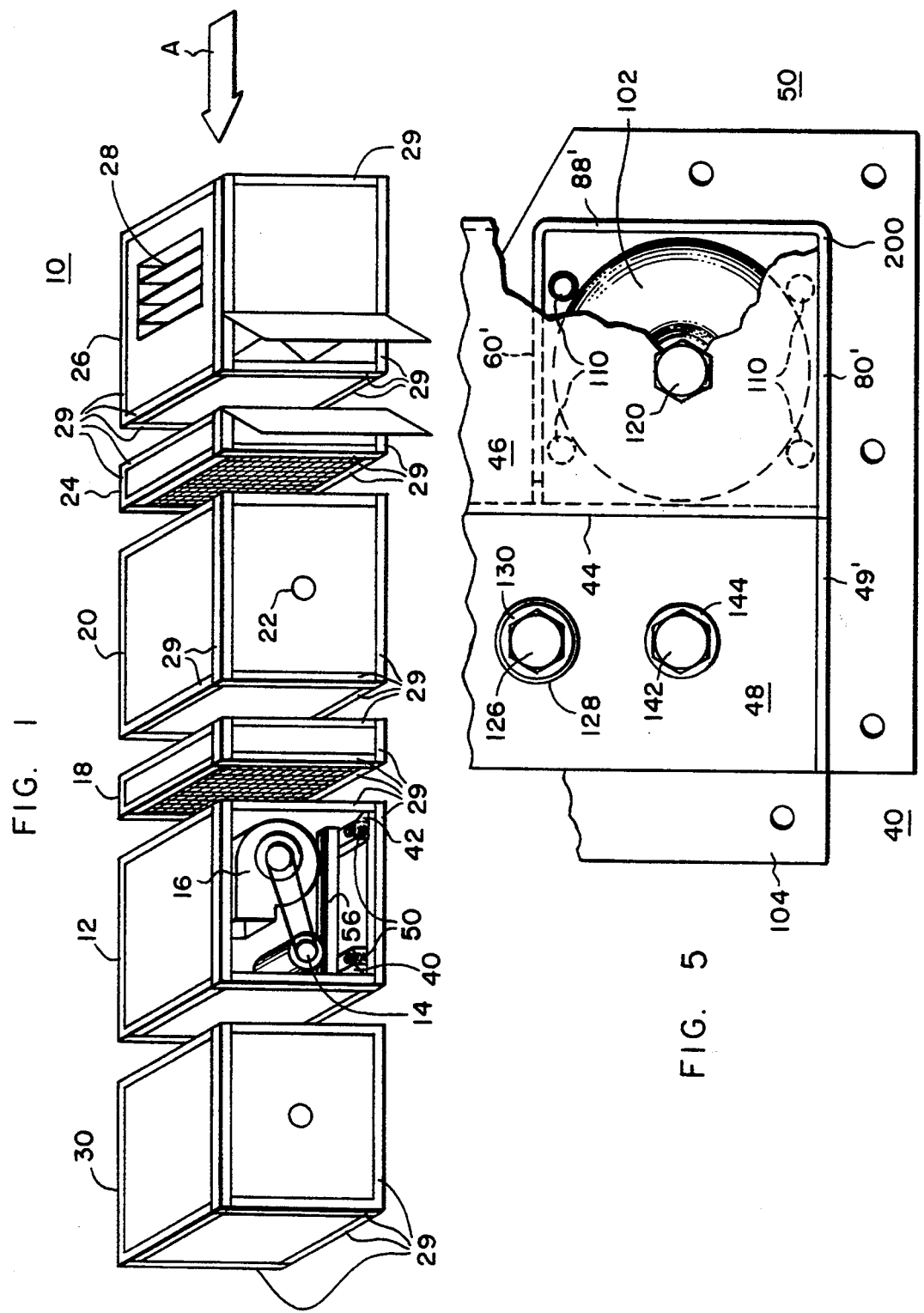
FIG. 1 shows a perspective view of a typical air handler system incorporating an integral suspension system in accordance with the present invention.
FIG. 5 shows a top view of an alternative embodiment.

An air handler is shown generally at 10 in FIG. 1. The air handler 10 is shown made up of a number of components. It is understood that these components and others are designed to be mixed and matched as needed for the particular application. Accordingly, the components shown are merely representative of a typical air handler 10.

Airflow through the air handler 10 is from right to left as depicted by arrow A in FIG. 1. Accordingly, the first component is the mixing box 26. The interior of mixing box 26 is shown in phantom to depict the construction of the various panels and baffles that facilitate the mixing of return with exterior air. The exterior air enters through a damper 28 and is utilized to supplement the chilled air during cool seasons of the year and to provide a selected amount of fresh air to the building.

Air flows from the mixing box 26 into the filter 24. This mixing box 26 is immediately adjacent to filter unit 24. The filter unit 24 is depicted with its access panel 25 in the open position. In some applications, a number of filter units are ganged together to provide the filtration necessary.

Air flows from the filter unit 24 to a coil unit 20 located adjacent the filter unit 24. Plumbing fixtures 22 facilitate the ingress and egress of chilled water to the coil unit 20.

After the coil unit 20, air flows through an inspection access 18 to a fan unit 12. The fan unit 12 is depicted showing a fan motor 14 and a fan 16. The inspection access 18 is located immediately to the right of the fan unit 12. The inspection access presents a viewing space 18 utilized to inspect the various components immediately adjacent to it.

Air is impelled by the fan 16 from the fan unit into the final component of the air handler 10, a discharge plenum 30. The discharge plenum 30 receives the mixed air from the fan unit 12 and discharges it into the ducts that spread out within the building to provide cooled or heated air to the various zones of the building being air conditioned.

To emphasize the separate nature of the various components 12, 18, 20, 24, 26 and 30 of the air handler 10, the components 12, 18, 20, 24, 26 and 30 are shown slightly separated. In actual assemblage, each component 12, 18, 20, 24, 26, 30 has an internal frame 29 which is securely bolted to the internal frame 29 of the adjacent component 12, 18, 20, 24, 26, 30 so as to unite these components into a single unit, the air handler 10. Additionally, a person of ordinary skill in the art will recognize that these various components are merely exemplary of one of many potential air handler arrangements.

The fan unit 12 is shown mounted on supporting Z rails 40, 42. Suspension systems 50 are shown integrated into Z rails 40, 42 respectively and isolating the fan unit 12 from the internal frame 29 and the rest of the air handler 10. An identical suspension system 50 is located at each of the four bottom corners of the fan unit 12 such that a pair of suspension systems 50 are associated with each Z rail 40, 42.

Referring to FIG. 2, vertical strap 44 forms the structural backbone of Z rails 40, 42. Vertical strap 44 is constructed of a metal of sufficient strength to bear the load of the fan 12 and its associated components such as a motor, wheel, housing and drive. An upper horizontal strap 46 is formed attached to the upper edge of vertical strap 44. Upper horizontal strap 46 is formed at a right angle to vertical strap 44. A lower horizontal strap 48 is formed at the lower edge of vertical strap 44. Lower horizontal strap 48 is formed such that it is at a right angle to vertical strap 44 and is oppositely directed from upper horizontal strap 46 with respect to vertical strap 44. The described orientation of vertical strap 44, upper horizontal strap 46, and lower horizontal strap 48 give Z rails the characteristic Z shape. The Z shaped cross section of Z rail 40 is apparent when viewing vertical strap 44, upper horizontal strap 46 and lower horizontal strap 48 from the end on perspective. Strengthening gusset 49 is a triangular shaped piece that is welded in place between lower horizontal strap 48 and vertical strap 44 at the two ends of each of rails 40, 42.

Upper horizontal strap 46 is designed with a plurality of holes 54 therethrough to accommodate the mounting of a variety of different motors and fan sites The fan motor 14 is a component of air handler 10 that represents a substantial percentage of the total weight of air handler 10. Accordingly the fan motor 14 is mounted on cross channels 56 to provide a greater measure of support. Cross channels 56 are then mounted by means of nuts and bolts directly to Z rails 40, 42 in a conventional manner. Other components can be directly attached to the Z rails 40, 42.

The details of the suspension systems are best shown in FIGS. 2-4. Each suspension system 50 includes a spring support receptacle 58. The spring support receptacles 58 are formed cooperatively with and integral to Z rails 40, 42. Each spring support receptacle 58 is preferably formed in the shape of a cube with the downward facing side open. However, other shapes (such as octagonal, hexagonal, triangular and circular) which provide the same function are also contemplated. The cube referenced above comprises first, second, third and fourth vertical walls, a horizontal wall and a horizontal opening 202. A portion 57 of the vertical strap 44 forms the first vertical wall of spring support receptacle 58 and a portion 59 of the upper horizontal strap 46 forms the horizontal wall of the spring support receptacle 58.

An L-shaped plate 60 is welded into Z rail 40, 42, forming the second vertical wall of the spring support receptacle 58. The plate 60 includes a first leg 62 formed perpendicular to both vertical strap 44 and upper horizontal strap 46 and held in place by weldments 64, best shown in FIG. 4. The first leg 62 of the L-shaped plate 60 has a vertical dimension substantially equal to the vertical dimension of vertical strap 44 and a horizontal dimension substantially equal to the horizontal dimension of upper horizontal strap 46. The second leg 66 of the L-shaped plate 60 is formed perpendicular to upper horizontal strap 46 and parallel with vertical strap 44. The second leg 66 is affixed to upper horizontal strap 46 by weldments 68. A hole 70 is formed approximately central to first leg 66.

As viewed in FIGS. 2 and 3, the spring support receptacle 58 includes an end plate 80, forming a third vertical wall of spring support receptacle 58. Preferably the end plate 80 and the strengthening gusset 49 are formed from a single piece. The end plate 80 is affixed to Z rail 40, 42 by weldments 82. The end plate 80 has a vertical dimension substantially equal to the vertical dimension of vertical strap 44 and a horizontal dimension substantially equal to the horizontal dimension of upper horizontal strap 46. An oval shaped aperture comprising a view slot 84 is formed in end plate 80. As shown in FIG. 3, the view slot 84 may be used to view suspension components within spring support receptacle 58. A narrow slot 86 is formed in end plate 80 proximate the vertical edge of end plate 80 that is most distant from vertical strap 44.

The fourth vertical wall of the spring support receptacle 58 is formed by a cover angle 88. The cover angle 88 is best viewed in FIGS. 2 and 3. The cover angle 88 is preferably a rectangular metallic piece. At a first end it has a single bore 90 that is preferably centrally disposed between the top and bottom of cover angle 88. The second end of cover angle 88 terminates in a small right angle bend 92.

Cover angle 88 is freely installable and removable from spring support receptacle 58. Cover angle 88 is installed by inserting right angle bend 92 into slot 86 of end plate 80. Cover angle 88 is then rotated inward until the second end of cover angle 88 comes in contact with the second leg 66 of inside plate 60. At this point, bore 90 is registry with bore 70 of second leg 66. A suitable screw 94 is passed through bore 90 and threaded into threaded bore 70, securing cover angle 88 in place.

A spring 100 is retained between a cup washer 102 and a base plate 104. The base plate 104 is conventionally attached to the internal frame 29. Spring 100 is selected by using conventional means taking into account the weight to be supported, the amount of vertical travel desired, and the percent of total load bearing capacity that the spring should bear under normal conditions. An allowance of 50% additional capacity beyond weighted load is good practice. This means that a spring 100 rated for two inches of deflection would not have the coils touching before 3 inches of travel is attained. When the coils of spring 100 are touching, the spring 100 is in a solid condition under full compression. A fifty percent over travel allowance will allow for an acceptable 50 percent overload.

Additionally, the spring 100 is designed such that when the coils are touching, the elastic limit of spring 100 has not been exceeded. Accordingly, when the load that causes the coils to touch is removed, spring 100 will return to full height. Since the total vibration amplitudes are very small and the movement of each of the coils that comprise spring 100 is the total amplitude of compressive motion divided by the number of the active coils, it can be understood that there is very little movement of spring 100. Accordingly, the stress cycle of the spring 100 is close to zero. Such application of spring 100 approaches a static loading condition. When designed in this manner, springs 100 will continue to perform the suspension function indefinitely in the application.

The spring 100 is substantially enclosed within the spring support receptacle 58. Spring support receptacle 58 provides the necessary lateral containment of spring 100 that is required to prevent unwanted lateral displacement while permitting the needed vertical motion of spring 100 and accommodating easy replacement and interchange of spring 100.

Cup washer 102 is in the form of an inverted cup. The lip of the cup is designed to encompass the upper first ring of coils of spring 100. Cup washer 102 is a solid metallic piece, with an inward deflecting dimple 106 at the crown of cup washer 102. The exterior diameter of cup washer 102 is sized such that cup washer 102 will fit in a horizontal orientation within spring receptacle 58. Alternatively, the cup washer 102 may be omitted and the spring 100 directly contact the portion 59 of the upper horizontal strap 46.

Base plate 104 preferably has four upwardly directed spring retaining bolts 110. Spring retaining bolts 110 are preferably oriented in a square pattern such that a circle inscribed within the square defined by the spring retaining bolts 110 has a diameter that is just slightly greater than the diameter of the lowest coil of spring 100. Spring retaining bolts 110 are threaded into base plate 104 and engage the outer periphery of the bottom coil of spring 100. As such, spring retaining bolts 110 act to prevent lateral displacement of spring 100 with respect to base plate 104. Since the point of engagement is only at the outer periphery of spring 100, spring 100 may be readily withdrawn from engagement with spring retaining bolts 110 by vertical motion.

FIG. 5 shows an alternative, now preferred, embodiment of the present invention where the strengthening gusset 49, the third vertical wall 80, the fourth vertical wall 88, and the second vertical wall 60 are formed as a single unit 200. In this alternative embodiment, like reference numerals designate like components, and accented reference designated similar components to those numerals used in connection with the previous embodiment. In the alternative embodiment, a strengthening gusset 49' and a third vertical wall 80' are welded to the Z rail 40 in a conventional manner as are a fourth vertical wall 88' and a second vertical wall 60'. Functionally, this embodiment is identical to the embodiment described above with the exception that spring replacement is accomplished by jacking the Z bar assembly up until the spring 100 can be removed from below, i.e. through the horizontal opening 202 of the spring receptacle 58. In the embodiment above the spring was replaced by firstly removing the screw 94 and subsequently removing the cover angle 88 in the reverse manner of installation thus allowing a side access to spring 100 through the fourth vertical wall.

The springs 100 are designed to be utilized in the suspension system and have a generally uniform height and diameter without regard to the load carrying capability of the springs 100. By utilizing uniform dimensions, it is ensured that the springs 100 of varying load bearing capabilities are readily interchangeable in the suspension system. In assembly, the lower coil of spring 100 is placed within the space defined by the four spring retaining bolts 110. Spring retaining bolts prevent lateral motion of spring 110 across base plate 104, but spring 104 may be freely removed from spring retaining bolts 104 by withdrawing spring 100 in a vertical direction. This freedom of removal facilitates the replacement and interchanging of spring 100 when needed.

Cup washer 102 is placed on top of spring 100 in a frictional fit. Spring 100 and cup washer 102 are then slipped upward into spring support receptacle 58. At this point, the upper surface of cup washer 102 will abut the underside of the portion of upper horizontal strap 46 that forms the top of spring support receptacle 58. A selected distance is provided between the upper surface of base plate 104 and the lower surface of lower horizontal strap 48 such that under full compression of spring 100, e.g. when the coils of spring 100 are touching, lower horizontal strap 48 does not come into contact with base plate 104, but is held a certain distance therefrom.

A bore 114 is provided in upper horizontal strap 46 and is positioned in registry with the center of dimple 106 in cup washer 102. Weld nut 116 is brought into registry with bore 114 and is welded to the upper surface of upper horizontal strategy 46 by weldments 118. Adjusting bolt 120 with jam nut 122 threaded thereon, is threaded into weld nut 116 and through bore 114 until adjusting bolt 120 engages the upper side of dimple 106. The levelling of air handler 10 is facilitated by screwing the adjusting bolt 120 into or out of bore 114, thereby increasing or decreasing the distance between the top of cup washer 102 and the lower surface of horizontal strap 46. When the desired height is attained, the jam nut 112 is tightened onto the weld nut 116, thereby locking adjusting bolt 120 in the desired position. Thus the static distance D in FIG. 4 between the air handler 10 and the Z rail 40, 42 can be controlled.

For locations where seismic activity has the potential for occurring, it is desirable to provide a restraint with some compliance in both the horizontal and vertical planes to accommodate motion induced by seismic activity. Accordingly, a seismic snubber 124 is provided. Seismic snubber 124 is comprised of snubber bolt 126, snubber grommet 128, washer 130, and bolt 132. Snubber bolt 126 is brought downward through bore 134 in base plate 104 engages bold 132 which is attached to the base plate 104.

A relatively large grommet bore 136 is formed in lower horizontal strap 48. Bore 134 is concentric with grommet bore 136 when base plate 104 is properly positioned beneath Z rail 40, 42.

Snubber grommet 128 is donut shaped having an interior aperture that is sized to closely engage snubber bolt 126. Snubber grommet 128 is constructed of a material selected for its elastomeric properties. Snubber grommet 128 is compressible mounted within grommet bore 136. In assembly, snubber bolt 126 passes through the center aperture of snubber grommet 128 and projects above snubber grommet 128. Snubber bolt 126 is threaded for a portion of its shank as depicted in FIG. 2. Preferably, snubber bolt 126 is approximately 2-½ inches long and has threads on the first half inch of the shank of snubber bolt 126.

Washer 130 is placed over the downwardly projecting shank of snubber bolt 126 and snubber bolt 126 is turned onto the nut 132. This locks snubber bolt 126 tightly in place and at the same time permits a limited amount of vertical play of Z rail 40, 42 with respect to base plate 104. Due to the elastic properties of snubber grommet 128, a limited amount of motion of Z rail 40, 42 is also permitted in the horizontal and plane with respect to base plate 104. In the presence of a force that would cause air handler 10 to exceed the limited amount of motion in such planes, seismic snubber 124 acts as a stop to restrain air handler 10 from further motion.

During transportation, it is desired that modular air handler 10 be fully restrained so as to avoid putting undue stresses on spring 100 and seismic snubber 124 due to motion of the vehicle conveying air handler 10. Accordingly, tie down system 140 is included. Tie down system 140 is best viewed in FIG. 2 and is comprised of tie down bolt 142, washer 144, spacers 146, and threaded plate 148. A bore 150 in lower horizontal strap 48 is brought into registry with a bore 152 in base plate 104. Washer 144 is placed over tie down bolt 142. Tie down bolt 142 is then inserted through bore 150. A selected number of spacers 146 are then placed over tie down bolt 142. Tie down bolt 142 is then slipped through bore 152 and tightened. Spacers 146 are selected such that when bolt 148 is tightened onto tie down bolt 142, spring 100 is at its normal operating height. In this position, Z rails 40, 42 are held rigidly affixed to base plate 104. When modular air handler 10 is located in position in the building in which it is to serve, tie down system 140 is removed allowing spring 100 and seismic snubber 124 to perform the tasks for which they were designed.

It will be understood that certain features and sub-combinations of the described invention are of utility of themselves and may be employed without reference to other features and sub-combinations. This is contemplated by and is within the scope of the claims. Since many possible embodiments may be made of the invention without departing from the scope thereof, it is to be understood that the embodiment herein set forth or shown in the accompanying drawings is to be interpreted as illustrative and not in a limiting sense.

We claim:

1. A suspension system for a component of an air conditioning system adapted for mounting the air conditioning system to a support surface, the component being mounted relative to the support surface on spaced apart support rails, comprising:

spring means having a plurality of coils for absorbing motion occurring between the air conditioning system component and the support surface, the spring means having a first end and a second end and defining a spring axis concentric with the coils of the spring means;

receptacle means operably coupled to a respective one of said support rails for supporting the first end of the spring means, said receptacle means being formed integral to said one of said support rails and defining a partially enclosed volume adapted for receiving and laterally supporting the first end of the spring means; and base means operably coupled to said support structure for supporting the second end of the spring means, said base means including a plurality of lateral movement restraining means for restraining movement of the second end of the spring means in a direction transverse to said spring axis.

2. A suspension system as claimed in claim 1 wherein the receptacle means includes a plurality of sides defining an enclosed volume having an opening therein, the support rail forming at least two of said sides.

3. A suspension system as claimed in claim 2 wherein the receptacle means includes at least one side being adapted for ready removal, exposing the spring and facilitating the withdrawal of the spring from the receptacle means.

4. A suspension system as claimed in claim 2 wherein the receptacle means includes at least one side having structure defining an inspection port therein to enable visual inspection of the suspension components when the suspension system is installed on the component of the air conditioning system.

5. A suspension system as claimed in claim 2 wherein the receptacle means is formed as a single piece and wherein the plurality of sides includes at least three sides, first and second of said sides being substantially arranged at right angles to a third of said sides.

6. A suspension system as claimed in claim 5 wherein said first side is longer than said second side and wherein a distal end of said first side is not perpendicular to any other edge of said first side.

7. A suspension system as claimed in claim 1 including seismic snubber means for accommodating the motion induced in the component of the air conditioning system by a seismic event.

8. A suspension system as claimed in claim 7 wherein the seismic snubber means includes:

vertical restraint means for restraining the component of the air conditioning system being operably coupled to the base means;

elastomeric means having elastomeric properties for absorbing the motion of the component of the air conditioning system being in operable engagement with the vertical restraint means;

aperture means defined in the support rail for transmitting the motion of the component of the air conditioning system to the elastomeric means and being in compressive engagement with said elastomeric means; and hold down means operably coupled to the vertical restraint means for limiting the vertical motion of the component of the air conditioning system.

9. A suspension system as claimed in claim 7 including height adjustment means operably coupled to said spring means for adjusting the height of the rail with respect to the base means.

10. A suspension system as claimed in claim 9 wherein the height adjusting means further includes:
washer means disposed between the first end of the spring means and the receptacle means; and
threaded bolt means for bearing on the washer means having a threaded shank in threaded engagement with the receptacle means, the end of the threaded shank being operatively coupled to the washer means such that threading the threaded bolt means with respect to the receptacle means displaces the washer means a selected distance from the receptacle means.

11. A suspension system as claimed in claim 9 including tie down means for limiting the range of travel of the suspension system during transport of the component of the air conditioning system.

12. A suspension system as claimed in claim 11 wherein the tie down means includes:
rigid connector means extending between the base means and the support rail for rigidly coupling the support rail to the base means, the connector having an elongate shank, the shank being threaded at the distal end;
nut means in threaded engagement with said threaded shank of the rigid connector means for compressing the spring of the suspension system; and
spacer means interposed between the base means and the support rail having a spacing dimension selected such that when the spring of the suspension system is fully compressed by the nut means, the distance from the support rail to the base means is substantially equal to the spacing dimension of the spacer means.

13. A suspension system for a component of an air conditioning system adapted for mounting the air conditioning system to a support surface, the component being mounted relative to the support surface on spaced apart support rails, the support rails having a Z configuration, comprising:
spring means having a plurality of coils for absorbing motion occurring between the air conditioning system component and the support surface, the spring means having a first end and a second end and defining a spring axis concentric with the coils of the spring means;
receptacle means operably coupled to a respective one of said support rails for supporting the first end of the spring means, said receptacle means being formed integral to said one of said support rails and defining a partially enclosed volume adapted for receiving and laterally supporting the first end of the spring means the receptacle means comprising four side surfaces and an enclosed top surface, one side surface and the top surface being formed by portions of the Z configured rail and a second side surface being adapted for ready removal; and
base means operably coupled to said support structure for supporting the second end of the spring means, said base means including a plurality of lateral movement restraining means for restraining movement of the second end of the spring means in a direction transverse to said spring axis.

14. A suspension system for the fan unit of an air handler comprising:
an air handler having an air handler frame;
a fan having a fan frame, the fan frame including a Z rail, the Z rail including a first vertical portion interconnecting first and second horizontal portions where the horizontal portions are on opposite sides of the vertical portion so as to form a generally Z shape;
a spring;
a spring receptacle enclosing the spring, wherein the spring receptacle includes first, second and third sides arranged about the spring and wherein the spring receptacle is affixed to an end of the Z rail such that the first horizontal portion and the vertical portion of the Z rail together with the spring assembly form an enclosure about the spring;
the spring having first and second ends such that the first end engages the air handler frame and the second end engages the first horizontal portion of the Z rail of the fan frame.

15. The system of claim 14 wherein the spring receptacle includes a strengthening gusset engaging the vertical portion and the second horizontal portion of the Z rail.

16. The system of claim 15 wherein the strengthening gusset and the first, second and third sides of the spring receptacle are formed from a unitary piece.

17. The system of claim 16 further including means for adjusting a static distance between the air handler frame and the fan frame.

18. The system of claim 17 further including a seismic snubber for accommodating motion induced by a seismic event.

19. The system of claim 14 wherein the second side of the spring receptacle is arranged generally parallel to the first vertical portion of the Z rail and where the second side is removable.

20. The system of claim 19 wherein the first and third sides include first and second respective means for removably engaging the second side.

21. The system of claim 14 wherein the spring assembly is generally u-shaped.

22. The system of claim 21 further including means for adjusting a static distance between the air handler frame and the fan frame.

23. The system of claim 22 where the height adjusting means is associated with the first horizontal portion of the Z rail.

24. The system of claim 22 where the height adjusting means is associated with the air handler frame.

25. The system of claim 22 further including a vertically restrained seismic snubber for accommodating seismic activity.

* * * * *